(No Model.)  2 Sheets—Sheet 1.
W. G. A. BONWILL.
DENTAL OR SURGICAL ENGINE.
No. 282,044.  Patented July 31, 1883.
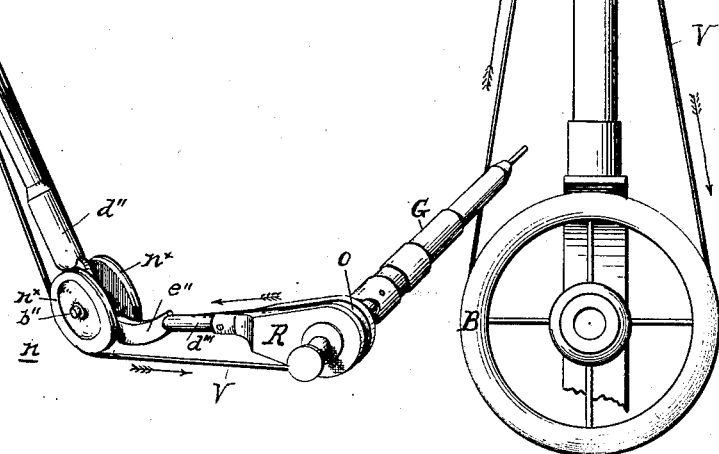

(No Model.) 2 Sheets—Sheet 2.
W. G. A. BONWILL.
DENTAL OR SURGICAL ENGINE.
No. 282,044. Patented July 31, 1883.
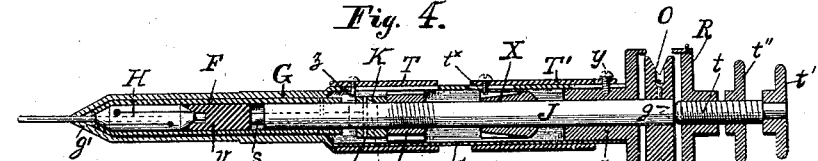
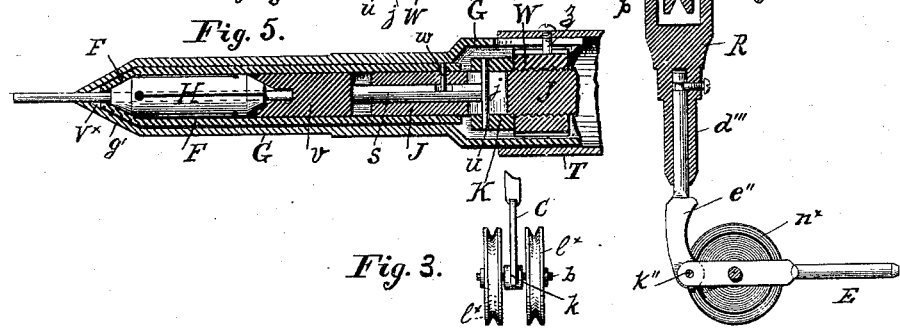
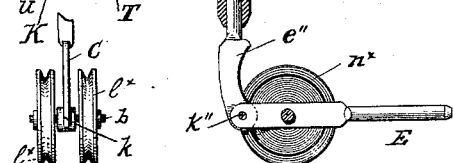
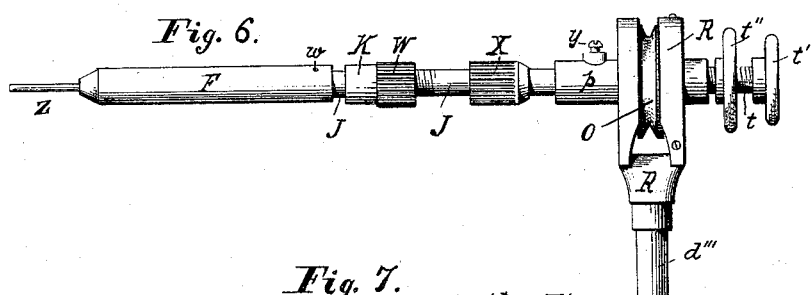
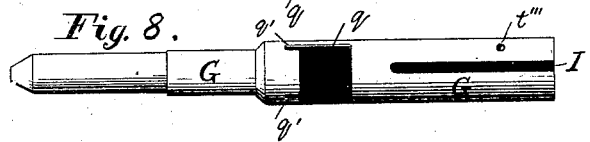
WITNESSES:
Wm G. A. Bonwill
INVENTOR
By his Attorneys

UNITED STATES PATENT OFFICE.

WILLIAM G. A. BONWILL, OF PHILADELPHIA, PENNSYLVANIA.

DENTAL OR SURGICAL ENGINE.

SPECIFICATION forming part of Letters Patent No. 282,044, dated July 31, 1883.

Application filed October 30, 1882. (No model.)

*To all whom it may concern:*

Be it known that I, WILLIAM G. A. BONWILL, of the city and county of Philadelphia, in the State of Pennsylvania, have invented a new and useful Improvement in Universal Connections and Hand-Pieces for the Driving Devices of Surgical, Dental, and other Tools, of which the following is a specification.

My invention relates to certain improvements especially applicable to surgical drills or lathes; and it embraces means for transmitting the motion of the driving-wheel of the drill or lathe to the operating-shaft or driven spindle of the hand-piece in such a manner that the latter may be adjusted to any desired position without interfering with the proper working of either the driving or the driven appliances.

My invention, so far as its flexible universal connection is concerned, has for its object to secure the same equable tension upon the endless cord or belt at any angle or position of the flexible parts; to permit the employment, in connection with said flexible parts, of an improved universal tool-holding chuck; to guard against the effects of wear on the driven spindle and sheath or casing inclosing the same; to furnish through the medium of a single endless band such means for conveying motion as will preserve all delicacy of touch in the operation while the most positive and exact power is being transmitted; and to obviate the use of spiral springs and cables, while insuring stability to the various parts, ease to the operator, and safety to the patient.

My invention, so far as its hand-piece is concerned, has for its object to insure certainty in retention of the bit and prevent the possibility of dislodgement even at high speeds, an essential requisite in operations on the bones; to prevent the escape of oil from the working parts into the mouth of the patient or the entrance of saliva into the hand-piece to the injury of its operative parts, and incidentally to permit of the hand-piece being made smaller than has been heretofore possible.

The above results are attained by the peculiar construction and arrangement of parts hereinafter detailed—that is to say, by a novel construction of the joints of the universal flexible connection whereby the length of the endless band is the same whatever may be the position of the flexible arms, and whereby the employment of springs to keep the band taut upon the pulley of the hand-piece is obviated; and, further, by a novel construction of the hand-piece and the provision of a universal chuck, which enables the certain retention of bits of all the various constructions.

A convenient embodiment of a preferred construction of my invention is hereinafter described and claimed.

My present invention is an improvement upon the dental and surgical engine patented to me in and by Letters Patent No. 199,779, dated January 29, 1878, to which Letters Patent reference is to be made.

In the accompanying drawings, Figure 1 is a view partially in elevation and partially in perspective of an apparatus conveniently embodying my entire invention. Fig. 2 is a detailed view, in side elevation, of my improved construction of joint of the flexible connection, that idler-pulley which is nearest the eye being supposed removed. Fig. 3 is an inverted end elevation of one of said joints. Fig. 4 is a longitudinal central sectional elevation of the hand-piece of my engine. Fig. 5 is a similar but enlarged view of the front portion of the same. Fig. 6 is a side elevation of the same, the sheath or casing being removed. Fig. 7 is a side elevation of the sheath or casing, and its spindle-stopping and chuck-operating sleeves in place. Fig. 8 is a similar view of the same with the sleeves removed. Fig. 9 is a side elevation of the chuck and its plunger removed from their thimble.

Similar letters of reference indicate corresponding parts.

The following is a description of my invention:

A, Fig. 1, is a rigid vertical standard equipped with a suitable base or foundation, and in the present instance with the bearing of the driving-wheel B, to which power is applied by any suitable means. The standard is made hollow, and within it is fitted an adjustable tube or hollow supplemental standard, a', controlled as to its vertical position by a thumb-screw, S, or kindred device.

C is a standard-stem, the lower end of which fits free for rotation within the supplemental standard. Connected with this stem by a joint, $k$, of a character hereinafter specifically recited, is the flexible arm D, which corresponds to the upper arm of the human body, as set forth in my patent cited, while connected with said upper arm, D, by a similar joint is the forearm E, and with said forearm E also by a similar joint the wrist-piece $e''$, all as hereinafter detailed. The said joints, which connect the arms as stated, are provided with what I term the "shoulder" $l$, the "elbow" $m$, and the "wrist" $n$.

P is a bracket, hinged at its lower extremity to a bracket-collar, $i$, upon the stem C. The opposite extremity of the bracket is adapted to the upper arm, D, so as to slide thereon, and bears against a sliding collar, $c$, upon said arm, between which collar and a fixed but adjustable collar $a$ is a compressed spiral spring, $e$. The above contrivance enables the support of the upper arm at any desired angle, the tension of the spring and the adjustability of the collar $a$ co-operating to such result.

I am aware that rigid stays have been employed to support the upper arm of connections of this class, and to such a stay or to a bracket, broadly, I lay no claim, but simply employ a bracket in connection with a spring upon the upper arm, as represented and described, in order to provide means for the automatic accommodation of the upper arm to every movement of the hand-piece and forearm.

The upper extremity of the standard-stem C is hinged to the inner extremity of the upper arm, D, by the pivot $k$, Fig. 2, and two idler-pulleys, $l^\times l^\times$, are pinned by a common pivot, $b$, on opposite sides of the inner portion of said upper arm, D. The distance of the pivot $k$ of the arm D and the stem C from the pivot $b$ of the pulleys $l^\times$ is equal to the radius of the pulleys applied to said joint, and the position of said pivot with respect to said pulleys is in line with the bottom of the peripheral groove thereof, as clearly shown in Figs. 2 and 4. By this arrangement of pivot, which is applied to all of the joints, the relative angular position of the arms on either side of a given joint with respect to each other has no effect whatever upon the endless driving-band which passes over the pulleys, neither tightening nor relaxing it, as necessarily occurs in the case of a joint whose pivot corresponds with that of the pulleys connected therewith. This construction enables me, also, to dispense with springs for securing equable tension in the band, and, while itself securing such equable tension, enables perfect pliability to and ease of motion in all the joints.

The elbow and wrist joints $m n$ are, as stated, each provided with a joint similar to the shoulder-joint above described, and, if desired, all of these joints may be of the construction commonly found in rulers, and technically known as a "ruler-joint," whereby too wide opening of the joint is prevented, and the displacement thereby of the band from off the pulleys rendered impossible. It is advisable to so shoulder the joints that they cannot open at an angle greater than one hundred and sixty degrees.

The forward extremity of the upper arm, D, is fitted, feathered, and free to rotate within a tubular socket, $d'$, which is conformed to receive the idler-pulleys $m^\times m^\times$ of the elbow-joint. The socket $d'$ is in effect a part of the upper arm, D.

$b'$ is the common pivot of the elbow-idlers $m^\times$, and is fixed on said socket $d'$.

E is, as stated, the flexible forearm, the upper extremity, $e'$, of which is suitably conformed to the pivot $k'$ of the elbow-joint, which said pivot connects the forearm with the socket $d'$ of the upper arm.

The forward extremity of the forearm E is fitted, feathered, and free to rotate within a tubular socket, $d''$, which is conformed to receive the idler-pulleys $n^\times n^\times$ of the wrist-joint. The socket $d''$ is in effect a part of the forearm E.

$b''$ is the common pivot of the idler-pulleys $n^\times$ of the wrist-joint, and is fixed in said socket $d''$. It is of course immaterial on which side of each joint $k k' k''$ the idler-pulleys are pivoted.

R is a forked frame, which is a means of connecting the hand-piece with the flexible connection, and which is provided with a boss to receive the sheath of the hand-piece, and is conformed to contain the rear center pivot-pin, $t$, of the driven spindle J and the driven pulley O thereof. This forked frame R is provided with a socket, $d'''$, in which is fitted, feathered, and free to rotate the front extremity of a short arm or wrist-piece, $e''$, the rear extremity of which is connected by a pivot, $k'''$, Fig. 4, to the socket $d''$ of the forearm.

The idler-pulleys, two of which, as stated, there are at each joint, serve to convey the continuous band V in the direction of the arrows from the driving-wheel direct to the driven pulley O on the driven spindle of the hand-piece, thereby dispensing with the bevel-gearing of my former patent cited. The band is crossed between the elbow and wrist-joints to insure the right-hand rotation of the driven spindle.

By the above construction of a universal connection I attain the most perfect range of motion, and transmit with unfailing certainty and without variance the power of the motor-wheel direct to the driven spindle which actuates the bit in the hand-piece.

It will be understood that the principle of the construction of the above universal connection is equally applicable should said connection be made with either a less or a greater number of arms or members than those represented and described.

$p$ is a tubular boss formed upon the side of the forked frame R of the flexible connection, which serves to receive and afford means for the connection of the exterior casing or sheath G of the hand-piece, and through which the driven spindle J passes and revolves.

G is the sheath, Figs. 7 and 8, of the hand-piece, a tubular casing conveniently formed of slightly larger diameter as to its rear portion than as to its front, and terminated in a conical nose, $g'$, which is best formed of steel. The sheath is conformed to fit snugly over the tubular boss $p$, and to be secured thereto by a set-screw, $y$, or kindred contrivance.

J is the driven spindle, a cylindric shaft solid as to its rear portion and conically countersunk or reamed at $g$ at its extreme rear end to adapt it to a pivot center pin, $t$, which screws through the forked frame and is controlled as to its set by means of the thumb-screw $t'$.

$t''$ is a lock-nut threaded upon the shank of the pivot-pin $t$, and adapted to lock the latter with respect to the forked frame in any position in which it is set by its thumb-screw.

It is obvious that the pivot-pin may, if desired, be formed on the spindle and the conically-recessed bearing in the forked frame without affecting the results of the journaling. The front extremity of this driven spindle is longitudinally cored out to fit it to receive a plunger-rod, $s$, and at the rear of the cored portion said spindle is slotted longitudinally in the line of its diameter, as at $j$, all for a purpose hereinafter explained.

The front extremity of the spindle is equipped with a tubular thimble, F, which is rigidly connected to it, preferably by a pin, $w$, so as to revolve with it, said thimble being in effect a continuation and part of the spindle, and being slightly less in diameter than the sheath within which it is disposed. The thimble has a conical nose so conformed to the interior conical extremity $g'$ of the sheath as to be adapted to revolve against the latter in the manner of a cone-bearing, and to retain the body of the thimble out of contact with the sheath throughout its length.

It will now be understood that the driven spindle and its thimble are centered between and find their bearing upon the interior of the nose of the sheath at the one end and the pivot center pin, $t$, at the other, so that upon the application of power to the driven pulley O the spindle and thimble are revolved freely within the sheath.

The above method of journaling is capable of rapid adjustment to compensate for wear, reduces the friction to a minimum, and avoids lateral play or bearing surfaces.

X is a toothed stopping-collar, Fig. 6, fixedly connected with the spindle for convenience near its rear extremity, the office of which is to stop the revolution of the spindle. This stoppage is effected through the instrumentality of a sliding sleeve, T', hereinafter termed the "spindle-stopping sleeve," closely fitted to the exterior of the sheath and provided with a lug, $t^x$, downwardly projecting through a longitudinal slot, I, formed in the sheath to a depth sufficient upon the movement of said sleeve T' to cause it to engage between the teeth on the exterior of the stopping-collar. Thus in the position of parts represented in Fig. 4 the driven spindle is locked by the engagement of this stud $t^x$ with the teeth on the collar. A reverse movement of the sleeve T' sets the spindle free.

H is my improved chuck, being a hollow cylinder of a uniform diameter of bore, and having both of its extremities conically formed or turned to a taper. This chuck is made of a single piece of metal—that is to say, as an entirety or in a single piece—and is longitudinally split or slotted for a portion of its length from its ends inward, said slots $h$ being formed from both ends, and preferably in alternate series evenly disposed. The above device is in effect a compound spring-jaw chuck, into which a bit or other tool may be inserted partially to any desired extent, and firmly held, or through which said tool may be passed completely, and be, when the chuck is compressed, equally firmly held.

I am aware that chucks constructed of two slotted gripping-sleeves, the stem of one of which is arranged to fit within the body of the other, and both of which are slotted and conically shaped at the end, have heretofore been employed in hand-pieces and clamped upon the bits by compression between the conical termination of an inner casing or tubular shaft and a conically recessed rod actuated by a cam-lever bearing against a cylindrical slide-block between which and the recessed rod is interposed a spiral spring, and to such construction I lay no claim, as it is of the essence of my invention, so far as relates to the chuck, that the latter should be formed as an entirety or of a single piece of metal, a construction having the advantage that while the chuck can be made of smaller diameter externally it will yet take bits of a greater range of diameters.

$v$ is a chuck-compressing plunger, snugly fitted free for slight endwise motion within the spindle-thimble, squared off or otherwise suitably shaped as to its rear extremity and conically recessed as to its front extremity, so as to conform it to the conical rear extremity of the chuck, and adapt it when it is forced forward within the thimble to compress the rear jaws of the chuck at the same time that it forces said chuck forward, and occasions the compression of its front jaws against the conical interior of the nose of the thimble.

Many instrumentalities, as a mechanic will readily comprehend, may be employed to effect the advance of the plunger and the consequent compression of the chuck. I, however, prefer to employ the plunger-rod S, which in the set of the parts impinges against the rear face of the plunger, and the following devices for actuating said rod to a forward throw.

K is a sliding collar surrounding the spindle, and provided with a pin, $u$, which passes through the slot $j$ in the spindle, and against which the rear extremity of the plunger-rod abuts.

It will be understood that any device which pushes the collar forward will, through the instrumentality of this pin $u$, occasion the forward movement of the plunger-rod and the advance of the plunger. The device which I elect to employ is a toothed screw-collar, W, threaded upon the driven spindle itself immediately in the rear of the sliding collar K, which, when turned in one direction, forces or slides said collar forward, with the result of the compression of the chuck, as above explained, while, when turned in the other, releases the collar, and permits the retreat of the plunger-rod and plunger. I effect the rotation of this toothed screw-collar by a rotatable toothed sleeve, T, which I term the "chuck-operating sleeve," snugly fitted upon the sheath forward of the spindle-stopping sleeve T', which sleeve, also, is provided with an internally-projecting lug, $z$, projecting down to within the range of the teeth on the screw-collar W through a rectangular opening, $q$, in the sheath, best of the breadth of one-half the circumference of said sheath, which is of such size as to permit of both the rotation and the endwise movement of the sleeve T. By the manipulation of this rotatable chuck-operating slide-sleeve T its lug $z$ can be engaged with the teeth on the screw-collar, and be caused to throw said collar in one or the other direction, or can be disengaged therefrom and moved out of the range of engagement.

As a convenient means of retaining the chuck-operating sleeve out of range of engagement with the screw-collar, I provide slots $q'$ $q'$ in the forward corners of the opening $q$, into either of which the lug $z$ can be entered.

Z is the bit.

The nose of the sheath G, in which the hollow thimble containing the chuck has its bearing, is, as stated, made of steel, and is formed expressly to prevent the oil from working into the mouth of the thimble, and thence into the chuck; also, to prevent its passing upon the outside of the sheath, and, further, to prevent the saliva and other fluids in the mouth from working into the interior parts and causing rust or injury. The above results are attained, first, by having the hole in the end of the steel nose of the sheath as nearly as possible of the diameter of the bit which passes through it, without, however, permitting actual contact, thereby obviating all capillary action; and, second, by dressing off the extremity of the nose of the thimble, so as to leave an annular conical space, $V^\times$, between the dressed-off portion of said nose and the sheath. After its employment in screwing up the toothed screw-collar the chuck-operating sleeve T is thrown forward and its lug engaged in one of the slots, $q'$. The spindle-stopping sleeve T' is then slid forward, so as to withdraw its lug from the teeth of the stopping-collar and set the spindle free, and brought into contact with the rear face of the chuck-operating sleeve. The spindle-stopping sleeve is slotted longitudinally to give to it a frictional spring-grip upon the sheath, and upon its inner face it may be provided with a small projection or stud, (not shown,) which, when said sleeve is slid forward, will spring into a depression, $t'''$, in the sheath, and serve to retain the sleeve against possibility of accidental retreat.

By the operation described the driven spindle, thimble, chuck-in bite upon the bit, plunger, plunger-rod, sliding collar, toothed screw-collar, and toothed stopping-collar are all set free for rotation as a connected and rigid whole. To occasion the stoppage of the tool and permit the removal of the bit the spindle-stopping sleeve T' is drawn back and engaged with the stopping-collar of the spindle, and the chuck-operating sleeve manipulated to cause the reversal of the toothed screw-collar and the loosening of the chuck and its operative instrumentalities. The construction of parts is such that the spindle, when the bit has been locked in place, can be revolved in either direction, while the arrangement of the chuck-operating sleeve with respect to the toothed screw-collar is such as to give the greatest power to the fingers in binding in the bit. The application of the sheath to the forked frame is such that the former can be readily removed, while the connection of the thimble with the spindle enables quick detachment for oiling, cleaning, or repair. In adjusting the hand-piece to other engines the forked frame is dispensed with and the boss suitably conformed itself to retain the center pivot-pin bearing.

The improvements shown and described are applicable to classes of machinery other than dental drills. For instance, they may be applied to dental lathes or to the rotation of shafts generally.

Having thus described my invention, I claim—

1. As a new article of manufacture, a chuck for surgical, dental, and other tools, being a hollow cylinder, preferably of uniform diameter of bore, formed of one piece of metal, both of the extremities of which are conically formed or turned to a taper, and which is provided with a series of slots extending from both ends inward, a portion of its length preferably in alternate series, substantially as set forth.

2. In a surgical or dental hand-piece, in combination, a double-taper ended spring-jawed chuck formed of a single piece of metal, a hollow thimble being a part of or connected with the driven spindle and revolving therewith, within which said chuck operates, an inclosing-casing, within which said thimble and spindle revolve, the chuck-compressing plunger, the plunger-rod, the sliding collar on the spindle, the toothed screw-collar, and means for operating said collar, substantially as and for the purpose specified.

3. As a device for actuating the chuck-operating plunger to its endwise throw, the plunger-rod, in combination with the sliding collar on the spindle, the toothed screw-collar, and the chuck-operating sleeve on the sheath, substantially as set forth.

4. As a means of connection between the hand-piece and universal flexible connection of a surgical or dental engine, and as a device for containing the driven pulley of the bit-operating spindle, a forked frame provided with a boss or kindred contrivance for the retention of the sheath with the rear bearing of the spindle, and with a socket for the extreme front arm of the universal connection, to which arm also a pair of idler-pulleys are applied, substantially as described.

5. As a device for effecting the stoppage of the spindle, the combination of the driven spindle, the toothed stopping-collar fixedly connected with said spindle, the sheath provided with a slot, and the spindle-stopping sleeve provided with a lug passing through the slot in the sheath, substantially as set forth.

6. As a device for retaining the chuck-operating sleeve out of range of engagement with the toothed screw-collar, the spindle-stopping sleeve, which is controlled to slide lengthwise in frictional contact with the sheath, in combination with said sheath, substantially as set forth.

7. In a universal flexible connection for surgical or dental engines, a joint or hinge for contiguous arms or members of the connection, the pivot of which is at the extremities of said arms, in combination with a pair of idler-pulleys, the pivot or axle of which is applied to either of said members at a distance from their pivot approximately equal to the radius of the pulleys, substantially as described.

In testimony whereof I have hereunto signed my name this 14th day of October, A. D. 1882.

WM. G. A. BONWILL.

In presence of—
  J. BONSALL TAYLOR,
  WM. C. STRAWBRIDGE.